Feb. 16, 1932.  M. E. THOMPSON  1,845,363
SEALING DEVICE
Filed June 16, 1927
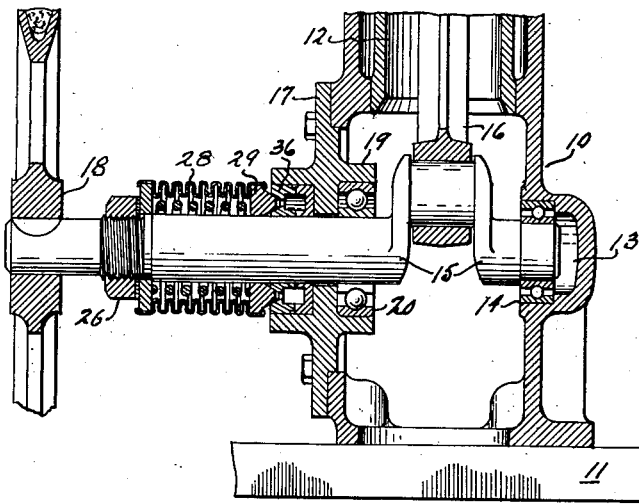
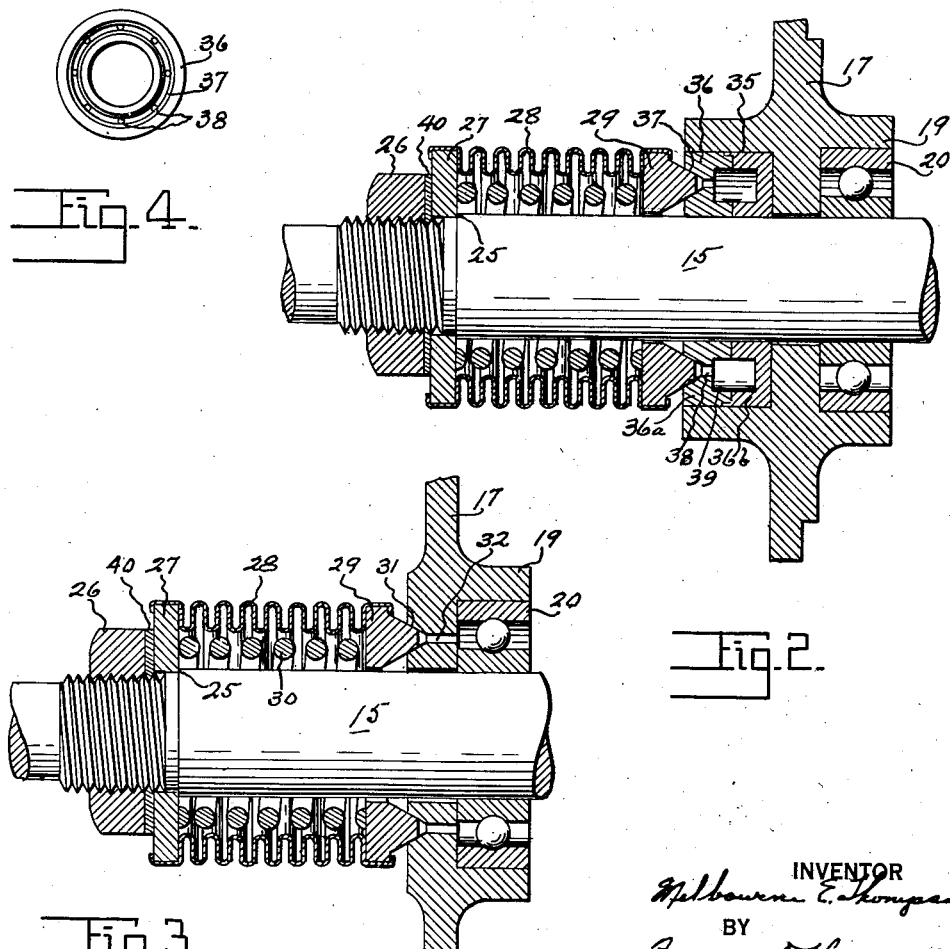
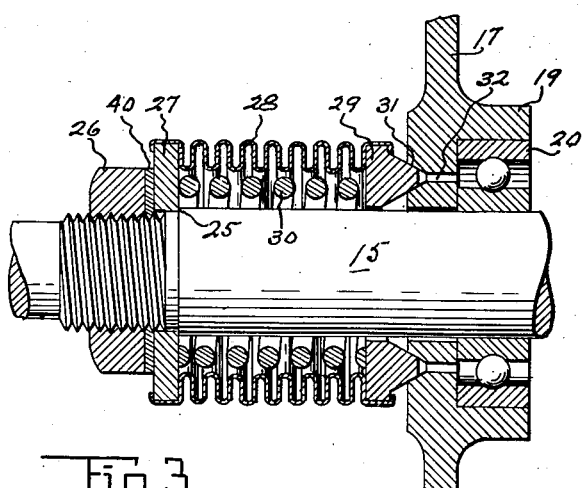
INVENTOR
Melbourne E. Thompson
BY
Francis D. Hardesty
ATTORNEY Patented Feb. 16, 1932

1,845,363

UNITED STATES PATENT OFFICE

MELBOURNE E. THOMPSON, OF DETROIT, MICHIGAN, ASSIGNOR TO TRIPPENSEE SALES AND MANUFACTURING COMPANY, OF DETROIT, MICHIGAN, A CORPORATION OF MICHIGAN

SEALING DEVICE

Application filed June 16, 1927. Serial No. 199,275.

The present invention relates to refrigerating apparatus and more especially to compressors therefor and has among its objects a simple easily installed and efficiently operating sealing means for preventing escape of fluids from the crank case of said compressors.

Another object is such a sealing means that is long lived, does not require adjustment and maintains the tightness of the seal in spite of wear.

Other objects will readily occur to those skilled in the art upon reference to the following description and the accompanying drawings, in which:—

Fig. 1 is a vertical section through the crank case of a compressor showing the sealing means;

Fig. 2 is a similar section through the sealing means on a larger scale;

Fig. 3 is a view similar to Fig. 2 but showing a slightly modified construction; and Fig. 4 is an elevation of the seat ring.

In the drawings, the crank case 10 of a compressor is shown as mounted on a base 11 and as carrying a cylinder 12. In one wall of the crank case 10 may be formed a recess 13 for the reception of a ball bearing 14, in which is mounted the end of a crankshaft 15 carrying connecting rod 16. The latter will operate the usual piston (not shown) in the cylinder 12.

The side of crank case opposite bearing 14 is open and will be closed by the plate 17 through which will extend the other end of shaft 15 and upon the latter will be mounted the drive pulley 18. The inner side of plate 17 will preferably be provided with a seat 19 for ball bearing 20 forming the second bearing for shaft 15.

The present invention provides means for sealing the opening in plate 17 through which the shaft 15 passes and for this purpose, the shaft 15 is provided with a shoulder 25 and has the reduced portion threaded for a nut 26. This nut 26 presses tightly against shoulder 25 a washer 27 which has secured to it, as by soldering or brazing, a metallic bellows diaphragm (known to the trade as a "sylphon") 28 having at its other end a ring of anti-friction metal 29 also soldered or brazed thereto.

The ring 29 is V-shaped in section with the apex extending away from the bellows 28.

This bellows unit is adapted to surround the shaft 15 between shoulder 25 and the plate 17 and encloses a spring 30 adapted to maintain the bellows extended.

In plate 17 around the shaft opening is provided a V-shaped seat which may have the form of a groove 31 in the face of the plate as shown in Fig. 3. In this form openings 32 will be provided from the bottom of groove 31 through the plate to permit oiling of the contacting faces of groove 31 and ring 29 by splash from the interior of the case.

A preferred form of coacting seat for ring 29, however, is shown in Figs. 1, 2, and 3. In these figures, the plate 17 is shown as provided with an annular recess 35 around the shaft opening similar to that on the inside for the bearing 20. Into this recess 35 is pressed tightly a hollow ring 36 having in its outer surface a groove 37 to coact with ring 29. This ring is preferably made in two parts 36a and 36b as shown and the two brazed or soldered together. And the bottom of groove 37 is provided with openings 38 leading to the space 39 inside of the ring. After the ring has been formed the space 39 is filled with grease or heavy oil to provide lubrication for the contacting surfaces of ring 29 and groove 37.

In installing the sealing means, the bellows unit is pressed tightly into place by the nut 26, using a lead washer 40 if desired to insure sealing the unit to the shaft 15.

In operation, the bellows unit travels with the shaft 15 and the angular walls of ring 29 in groove 31 or 37 form a self seating sealing joint with considerable contacting surface on both sides of ring 29 thus insuring a gas tight closure for the crank case.

Now having described the invention and the preferred form of embodiment thereof, it is to be understood that the said invention is to be limited, not to the specific details herein set forth but, only by the scope of the claims which follow.

I claim:—

1. Means for sealing an opening in a casing having a rotatable shaft extending therethru, comprising an extensible sleeve fixed at one end to the periphery of said shaft, and having at its free end a ring of antifriction material, a bearing groove in the adjacent wall of said casing to receive and be closed by said ring, and ducts leading from the bottom of said groove to a supply of oil whereby lubricating oil may be forced from said supply into said groove and thence outwardly thereof along the surface of said ring.

2. Means for sealing an opening in a casing having a rotatable shaft extending therethru, comprising an extensible sleeve fixed at one end to the periphery of said shaft, and having at its free end a ring of anti-friction material, a bearing groove in the adjacent wall of said casing to receive and be closed by said ring, and ducts leading from the bottom of said groove to a supply of oil under pressure whereby lubricating oil may be forced from said supply into said groove and thence outwardly thereof along the surface of said ring.

3. Means for sealing an opening in a casing having a rotatable shaft extending therethru, comprising an extensible sleeve fixed at one end to the periphery of said shaft, and having at its free end a V-shaped ring of antifriction material, a bearing groove in the adjacent wall of said casing to receive and be closed by said V-shaped ring, and ducts leading from the bottom of said groove to a supply of oil whereby lubricating oil may be forced from said supply into said groove and thence outwardly thereof along the surface of said V-shaped ring.

4. Means for sealing an opening in a casing having a rotatable shaft extending therethru, comprising an extensible sleeve fixed at one end to the periphery of said shaft, and having at its free end a V-shaped ring of antifriction material, a bearing groove in the adjacent wall of said casing to receive and be closed by said V-shaped ring, and ducts leading from the bottom of said groove to a supply of oil under pressure whereby lubricating oil may be forced from said supply into said groove and thence outwardly thereof along the surface of said V-shaped ring.

MELBOURNE E. THOMPSON.